(12) United States Patent
Zhang et al.

(10) Patent No.: US 10,798,473 B2
(45) Date of Patent: Oct. 6, 2020

(54) PASSIVE OPTICAL NETWORK SYSTEM AND IMPLEMENTATION METHOD THEREOF

(71) Applicant: ZTE CORPORATION, Shenzhen (CN)

(72) Inventors: Weiliang Zhang, Shenzhen (CN); Mingsheng Li, Shenzhen (CN); Dan Geng, Shenzhen (CN); Yong Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/465,904

(22) PCT Filed: Nov. 16, 2017

(86) PCT No.: PCT/CN2017/111302
§ 371 (c)(1),
(2) Date: May 31, 2019

(87) PCT Pub. No.: WO2018/099270
PCT Pub. Date: Jun. 7, 2018

(65) Prior Publication Data
US 2019/0327541 A1    Oct. 24, 2019

(30) Foreign Application Priority Data
Dec. 2, 2016  (CN) .......................... 2016 1 1096860

(51) Int. Cl.
*H04Q 11/00*    (2006.01)
(52) U.S. Cl.
CPC . *H04Q 11/0067* (2013.01); *H04Q 2011/0079* (2013.01); *H04Q 2011/0086* (2013.01)

(58) Field of Classification Search
CPC ....... H04Q 11/0067; H04Q 2011/0079; H04Q 2011/0086
(Continued)

(56) References Cited

U.S. PATENT DOCUMENTS 6,807,188 B1 * 10/2004 Blahut ................. H04J 3/0682
                                                              348/E7.07
7,043,541 B1 *  5/2006 Bechtolsheim ..... H04L 41/0663
                                                                709/223
(Continued)

FOREIGN PATENT DOCUMENTS

| CN | 101047450 A | 10/2007 |
| CN | 101964756 A | 2/2011 |

OTHER PUBLICATIONS

English Translation of International Search Report for International Application No. PCT/CN2017/111302 dated Feb. 5, 2018, 3 pages.

*Primary Examiner* — Dalzid E Singh
(74) *Attorney, Agent, or Firm* — Li & Cai Intellectual Property (USA) Office

(57) ABSTRACT

The invention discloses a passive optical network (PON) system and an implementation method thereof. A first transmission channel and a second transmission channel are provided between an optical line terminal (OLT) and an optical network unit (ONU) in the PON system. The method comprises: the ONU transmits data over the first transmission channel; the ONU transmits, over an uplink channel of the second transmission channel, all of uplink management information; or the ONU transmits, over the uplink channel of the second transmission channel, a part of the uplink management information, and transmits, over an uplink channel of the first transmission channel, the remaining uplink management information other than the part of the
(Continued)

uplink management information transmitted over the uplink channel of the second transmission channel.

20 Claims, 9 Drawing Sheets

(58) Field of Classification Search
USPC .......................................................... 398/66
See application file for complete search history.

(56) References Cited

U.S. PATENT DOCUMENTS

| | | | | |
|---|---|---|---|---|
| 2004/0146301 A1* | 7/2004 | Choi | .................. | H04Q 11/0067 |
| | | | | 398/58 |
| 2006/0115271 A1* | 6/2006 | Hwang | ............... | H04J 14/0246 |
| | | | | 398/72 |
| 2006/0268704 A1* | 11/2006 | Ansari | .................. | H04J 3/1694 |
| | | | | 370/230 |
| 2007/0110099 A1* | 5/2007 | Ozaki | .................... | H04B 10/27 |
| | | | | 370/468 |
| 2010/0142957 A1* | 6/2010 | Nakajima | ........... | H04J 14/0269 |
| | | | | 398/79 |
| 2011/0085799 A1* | 4/2011 | Mizutani | ............ | H04Q 11/0067 |
| | | | | 398/37 |
| 2011/0211837 A1* | 9/2011 | Sugawa | ............. | H04Q 11/0067 |
| | | | | 398/67 |
| 2013/0071111 A1* | 3/2013 | Yoo | .................... | H04Q 11/0067 |
| | | | | 398/38 |
| 2013/0094861 A1* | 4/2013 | Luo | .................... | H04J 14/0241 |
| | | | | 398/68 |
| 2013/0202304 A1* | 8/2013 | Boyd | ................. | H04L 12/2801 |
| | | | | 398/98 |
| 2013/0315594 A1* | 11/2013 | Liang | ................ | H04Q 11/0067 |
| | | | | 398/66 |
| 2015/0131632 A1* | 5/2015 | Hazani | .................. | H04W 74/04 |
| | | | | 370/336 |
| 2017/0093487 A1* | 3/2017 | Grammel | ............... | H04J 14/021 |
| 2017/0244487 A1* | 8/2017 | Gao | .................... | H04B 10/27 |
| 2019/0140763 A1* | 5/2019 | Yuan | .................. | H04J 14/0249 |

\* cited by examiner

PASSIVE OPTICAL NETWORK SYSTEM AND IMPLEMENTATION METHOD THEREOF

CROSS-REFERENCE TO RELATED APPLICATIONS

This is a continuation application, under 35 U.S.C. § 371, of PCT Application No. PCT/CN2017/111302, filed on Nov. 16, 2017, which is based upon and claims priority to Chinese Patent Application 201611096860.5, filed on Dec. 2, 2016, the whole contents thereof are incorporated herein by reference.

TECHNICAL FIELD

The present disclosure relates to passive optical network technologies, and more particularly to a passive optical network (PON) system and an implementation method thereof.

BACKGROUND

Traditional network architecture of passive optical network is shown in FIG. 1. The channel between the optical line terminal (OLT) and the optical network unit (ONU) transmits both data and management information, that is, the OLT and the ONU communicate through one channel. With the development of mobile networks, passive optical networks have gradually become one of the bearer technologies for mobile pre-transmission, mobile backhaul, sensor networks, and in-vehicle networks. When these network services are used, the transmission delay requirements for mobile networks and even passive optical networks as carriers are very strict.

Transmission delays in passive optical networks comprise: optical transmission delay, delay caused by opening quiet window, bandwidth allocation delay, and the like. Wherein the optical transmission delay is relevant to the distance of optical fiber, and transmission time for 20 KM is about 100 us. Opening quiet window is for OLT discovery, ranging ONU, as shown in FIG. 2, and is belong to an expense of channel connection initialization between the OLT and ONU. In order to find an ONU that is at most 20 KM away from the OLT, it is necessary to open a quiet window of 200 microseconds, during which the normally operating ONU cannot communicate normally with the OLT. On the other hand, in order to realize the rapid discovery of the ONU, the OLT needs to periodically open a quiet window to discover the ONU. The period is related to the actual application. If the ONU is required to register the ONU at the seconds level, the period should be the seconds level, that is, a quiet window of 200 microseconds at maximum must be opened in every seconds, since the quiet window is for the ONU to be registered and activated to transmit uplink signals, while the other ONUs which have been registered and activated and is normally working cannot transmit uplink signals in the quiet window. If a normally working ONU has uplink data to be sent at the beginning of the quiet window, it must wait for the quiet window to end before it has the opportunity to send the uplink data. In this case, the uplink data sent by the working ONU may cause a maximum of 200 microseconds delay. In the related art, when the OLT performs ranging to the ONU, it is also necessary to open a quiet window. However, when the OLT finds the ONU, the OLT can estimate the distance between the OLT and the ONU, that is, the OLT can estimate the arrival time of response that the OLT ranges to the ONU, and the quiet window for ranging is used exclusively for the ONU to be measured. It does not require multiple ONUs to compete, so a quiet window opened for ranging can be smaller than an opened quiet window that is found for the ONU. The delay for a working ONU is also small.

On the other hand, in traditional passive optical network systems, the bandwidth allocation is done generally based on the ONU's bandwidth request or the OLT's own detection of the ONU traffic, that is, dynamic bandwidth allocation. This bandwidth allocation method can achieve high bandwidth utilization, but there is a certain lag in a process of bandwidth allocation, and bring greater delay when the PON carries low latency services. Taking bandwidth allocation based on ONU bandwidth request as an example, as shown in FIG. 3, from user data arriving at the ONU until the ONU sending the user data to the OLT, there are following processes: the ONU requesting the bandwidth to the OLT according to the user data, the OLT inputting ONU bandwidth request to a DBA algorithm engine and obtaining a the process of obtaining a bandwidth allocation result from the DBA algorithm engine, the OLT transmitting the bandwidth allocation result to the ONU, and the ONU transmitting the user data at the determined time. The delays caused by the foregoing operations comprise ONU preparation bandwidth request time TDBRu, uplink transmission delay TPROGu, bandwidth allocation calculation time TDBA, downstream transmission delay TPROGd, transmission time offset TOFF, wherein in a case that the fiber has a 20 KM length, uplink transmission delay and downlink transmission delay are 100 microseconds, respectively, and bandwidth allocation method based on bandwidth request will at least bring a 200 microseconds delay to the uplink data transmission.

In order to reduce the transmission delay of the PON system, at least one of the above problems must be solved, and the above problems need to be solved in order for the PON system to carry services with high delay requirements such as mobile preamble, mobile backhaul, sensor network, and in-vehicle network.

This section provides background information related to the present disclosure which is not necessarily prior art.

SUMMARY

In order to solve the above technical problems, the present disclosure provides a PON system and an implementation method thereof, which can reduce the transmission delay of a passive optical network system.

In order to achieve the object of the present disclosure, the present disclosure provides an implementation method of a PON system, wherein a first transmission channel and a second transmission channel are provided between an OLT and an ONU in the PON system; and the method comprises:

the ONU transmits data over the first transmission channel;

the ONU transmits, over an uplink channel of the second transmission channel, all of uplink management information; or the ONU transmits, over the uplink channel of the second transmission channel, a part of the uplink management information, and transmits, over an uplink channel of the first transmission channel, remaining uplink management information other than the part of the uplink management information transmitted over the uplink channel of the second transmission channel.

In an embodiment, the method further comprises:

the OLT transmits, over a downlink channel of the first transmission channel or a downlink channel of the second transmission channel, all downlink management information; or the OLT transmits, over the downlink channel of the second transmission channel, a part of the downlink management information, and transmits, over the downlink channel of the first transmission channel, remaining downlink management information other than the part of the downlink management information transmitted over the downlink channel of the second transmission channel.

In an embodiment, the management information includes but is not limited to the following information:

management information in an optical network unit ONU discovering process;

management information in an ONU ranging process;

management information in bandwidth allocation;

optical network unit management control interface OMCI information, operation management and maintenance OAM information;

physical layer operation management and maintenance PLOAM information and multipoint control protocol MPCP information.

In an embodiment, a standard of the second transmission channel is different from or identical to a standard of the first transmission channel; or when the first transmission channel comprises a subchannel, the standard of the second transmission channel is the same as the standard of the subchannel of the first transmission channel; or when the first transmission channel comprises a plurality of subchannels, the second transmission channel is a subchannel in the first transmission channel for the ONU to transmit all or a part of the management information; remaining subchannels in the first transmission channel are used for the ONU to transmit data, or transmit the data and remaining management information other than the part of the management information transmitted to the OLT.

In an embodiment, the method further comprises:

the OLT allocates periodic bandwidths for the ONU according to characteristics of service carried on the PON system, and a spacing between two adjacent bandwidths is less than or equal to a fixed value T.

In an embodiment, the fixed value T is:

a difference value between a time t1 when traffic data arrives at the ONU and a time t2 when the ONU transmits processed traffic data to the OLT, and a time when the ONU processes traffic data is an upper time limit that the ONU processes traffic data, which is required to ensure completion of the service.

An embodiment of the disclosure further provides an implementation method of a PON system, comprising:

an OLT allocates periodic bandwidths for an ONU according to characteristics of service carried on the PON system, and a spacing between two adjacent bandwidths is less than or equal to a fixed value T.

In an embodiment, the fixed value T is:

a difference value between a time t1 when traffic data arrives at the ONU and a time t2 when the ONU transmits processed traffic data to the OLT, and a time when the ONU processes traffic data is an upper time limit that the ONU processes traffic data, which is required to ensure completion of the service.

In an embodiment, a first transmission channel and a second transmission channel are provided between an OLT and an ONU in the PON system; and the method comprises:

the ONU transmits data over the first transmission channel;

the ONU transmits, over an uplink channel of the second transmission channel, all of uplink management information; or the ONU transmits, over the uplink channel of the second transmission channel, a part of the uplink management information, and transmits, over an uplink channel of the first transmission channel, remaining uplink management information other than the part of the uplink management information transmitted over the uplink channel of the second transmission channel.

In an embodiment, the method further comprises:

the OLT transmits, over a downlink channel of the first transmission channel or a downlink channel of the second transmission channel, all downlink management information; or the OLT transmits, over the downlink channel of the second transmission channel, a part of the downlink management information, and transmits, over the downlink channel of the first transmission channel, remaining downlink management information other than the part of the downlink management information transmitted over the downlink channel of the second transmission channel.

In an embodiment, the management information includes but is not limited to the following information:

management information in an optical network unit ONU discovering process;

management information in an ONU ranging process;

management information in bandwidth allocation;

optical network unit management control interface OMCI information, operation management and maintenance OAM information;

physical layer operation management and maintenance PLOAM information and multipoint control protocol MPCP information.

In an embodiment, a standard of the second transmission channel is different from or identical to a standard of the first transmission channel; or when the first transmission channel comprises a subchannel, the standard of the second transmission channel is the same as the standard of the subchannel of the first transmission channel; or when the first transmission channel comprises a plurality of subchannels, the second transmission channel is a subchannel in the first transmission channel for the ONU to transmit all or a part of the management information; remaining subchannels in the first transmission channel are used for the ONU to transmit data, or transmit the data and remaining management information other than the part of the management information transmitted to the OLT.

An embodiment of the disclosure further provides a passive optical network PON system, a first transmission channel and a second transmission channel are provided between an optical line terminal OLT and an optical network unit ONU in the PON system; and wherein, the first transmission channel is configured to transmit data by the ONU;

an uplink channel of the second transmission channel is configured to transmit all of uplink management information by the ONU; or an uplink channel of the first transmission channel is configured to transmit remaining uplink management information other than the part of the uplink management information transmitted over the uplink channel of the second transmission channel by the ONU;

the uplink channel of the second transmission channel is configured to transmit a part of uplink management information by the ONU.

In an embodiment, a downlink channel of the first transmission channel or a downlink channel of the second transmission channel are also used by the OLT to transmit all of downlink management information; or the downlink channel of the second transmission channel is also used by the OLT to transmit a part of downlink management information;

the downlink channel of the first transmission channel is also used by the OLT to transmit remaining downlink management information other than the part of the downlink management information transmitted over the downlink channel of the second transmission channel.

In an embodiment, the management information includes but is not limited to the following information:

management information in an optical network unit ONU discovering process;

management information in an ONU ranging process;

management information in bandwidth allocation;

optical network unit management control interface OMCI information, operation management and maintenance OAM information;

physical layer operation management and maintenance PLOAM information and multipoint control protocol MPCP information.

In an embodiment, a standard of the second transmission channel is different from or identical to a standard of the first transmission channel; or when the first transmission channel comprises a subchannel, the standard of the second transmission channel is the same as the standard of the subchannel of the first transmission channel; or when the first transmission channel comprises a plurality of subchannels, the second transmission channel is a subchannel in the first transmission channel for the ONU to transmit all or a part of the management information; remaining subchannels in the first transmission channel are used for the ONU to transmit data, or transmit the data and remaining management information other than the part of the management information transmitted to the OLT.

In an embodiment, the OLT is also used to allocate periodic bandwidths for the ONU according to characteristics of service carried on the PON system, and a spacing between two adjacent bandwidths is less than or equal to a fixed value T.

In an embodiment, the fixed value T is:

a difference value between a time $t_1$ when traffic data arrives at the ONU and a time $t_2$ when the ONU transmits processed traffic data to the OLT, and a time when the ONU processes traffic data is an upper time limit that the ONU processes traffic data, which is required to ensure completion of the service.

An embodiment of the disclosure further provides a PON system, wherein an OLT in the system is configured to allocate periodic bandwidths for an ONU according to characteristics of service carried on the PON system, and a spacing between two adjacent bandwidths is less than or equal to a fixed value T.

In an embodiment, the fixed value T is:

a difference value between a time $t_1$ when traffic data arrives at the ONU and a time $t_2$ when the ONU transmits processed traffic data to the OLT, and a time when the ONU processes traffic data is an upper time limit that the ONU processes traffic data, which is required to ensure completion of the service.

In an embodiment, a first transmission channel and a second transmission channel are provided between an OLT and an ONU in the PON system; and wherein, the first transmission channel is configured to transmit data by the ONU;

an uplink channel of the second transmission channel is configured to transmit all of uplink management information by the ONU; or an uplink channel of the first transmission channel is configured to transmit remaining uplink management information other than the part of the uplink management information transmitted over the uplink channel of the second transmission channel by the ONU;

the uplink channel of the second transmission channel is configured to transmit a part of uplink management information by the ONU.

In an embodiment, a downlink channel of the first transmission channel or a downlink channel of the second transmission channel are also used by the OLT to transmit all of downlink management information; or the downlink channel of the second transmission channel is also used by the OLT to transmit a part of downlink management information;

the downlink channel of the first transmission channel is also used by the OLT to transmit remaining downlink management information other than the part of the downlink management information transmitted over the downlink channel of the second transmission channel.

In an embodiment, the management information includes but is not limited to the following information:

management information in an optical network unit ONU discovering process;

management information in an ONU ranging process;

management information in bandwidth allocation;

optical network unit management control interface OMCI information, operation management and maintenance OAM information;

physical layer operation management and maintenance PLOAM information and multipoint control protocol MPCP information.

In an embodiment, a standard of the second transmission channel is different from or identical to a standard of the first transmission channel; or when the first transmission channel comprises a subchannel, the standard of the second transmission channel is the same as the standard of the subchannel of the first transmission channel; or when the first transmission channel comprises a plurality of subchannels, the second transmission channel is a subchannel in the first transmission channel for the ONU to transmit all or a part of the management information; remaining subchannels in the first transmission channel are used for the ONU to transmit data, or transmit the data and remaining management information other than the part of the management information transmitted to the OLT.

Comparing with the prior art, in the embodiments of the disclosure, a first transmission channel and a second transmission channel are provided between an optical line terminal (OLT) and an optical network unit (ONU) in the PON system; and the method comprises: the ONU transmits data over the first transmission channel; the ONU transmits, over an uplink channel of the second transmission channel, all of uplink management information; or the ONU transmits, over the uplink channel of the second transmission channel, a part of the uplink management information, and transmits, over an uplink channel of the first transmission channel, remaining uplink management information other than the part of the uplink management information transmitted over the uplink channel of the second transmission channel. In the present disclosure, a part of or all of the management information is interacted on management channels such that the bandwidth occupied by the management information interaction is peeled from original data channel, so that bandwidth utilization the original data channel is higher, and delay of sending data is smaller and more controllable.

The embodiments of the disclosure further comprise: the OLT allocates periodic bandwidths for the ONU according to characteristics of service carried on the PON system, and a spacing between two adjacent bandwidths is less than or equal to a fixed value T. It can be seen that bandwidth allocation of the present disclosure is no longer dependent on bandwidth request of the ONU or the OLT monitoring traffic of the ONU, further reducing delay that the ONU sends data.

Other features and advantages of the disclosure will be set forth in the description which follows, and will be partially apparent from the description, or will be understood by implementing the disclosure. The objectives and other advantages of the disclosure may be realized and obtained by means of the structure particularly pointed in the description, the appended claims, and the drawings.

This section provides a summary of various implementations or examples of the technology described in the disclosure, and is not a comprehensive disclosure of the full scope or all features of the disclosed technology.

BRIEF DESCRIPTION OF THE DRAWINGS

The drawings provide a further understanding of aspects of the present disclosure, constitute a part of the specification, serve to explain the technical solution of the present disclosure together with embodiments of the disclosure, and will not limit the technical solution of the present disclosure.

FIG. 16 is a schematic view of the bandwidth allocation in a channel bonding system such as multi-channel NG-PON2/40GGPON/100GPON and the like;

FIG. 20 is a schematic view of the bandwidth allocation in a channel bonding system such as multi-channel NG-PON2/40GGPON/100GPON and the like.

DETAILED DESCRIPTION

In order to make the objects, technical solutions and advantages of the present invention more clear, the embodiments of the present disclosure will be described in detail below with reference to the accompanying drawings. It should be noted that, in the case of no conflict, the features in the embodiments and the embodiments in the present application may be arbitrarily combined with each other.

The steps illustrated in the flowchart of the drawings may be executed in a computer system such as a set of computer executable instructions. Also, although logical sequences are shown in the flowcharts, in some cases, the steps shown or described may be performed in a different order than the ones described herein.

Figure 1:
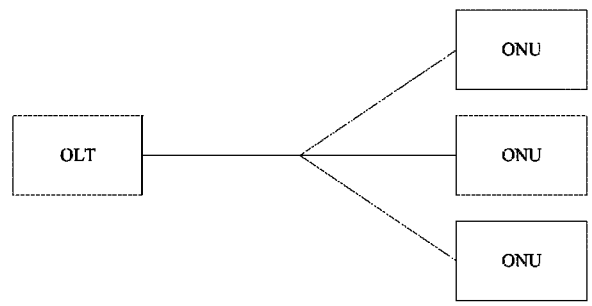
FIG. 1 is a schematic view of a conventional passive optical network architecture.
Figure 2:
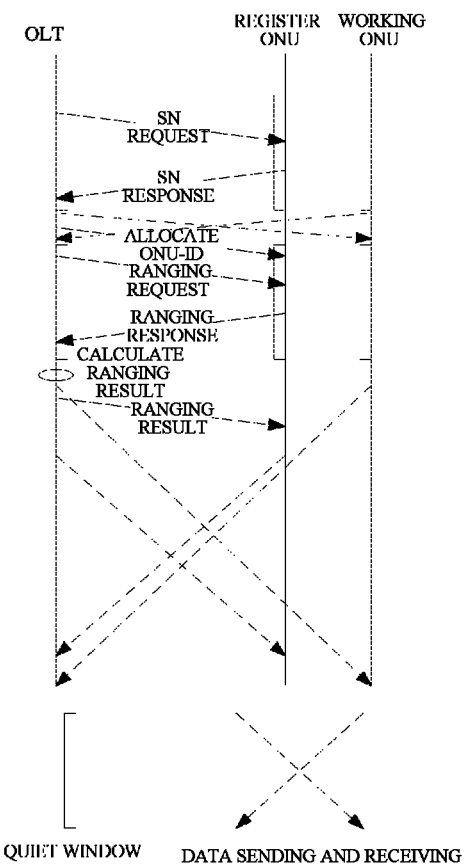
FIG. 2 is a schematic view showing that a quiet window influences a working ONU in an ONU registration process.
Figure 3:
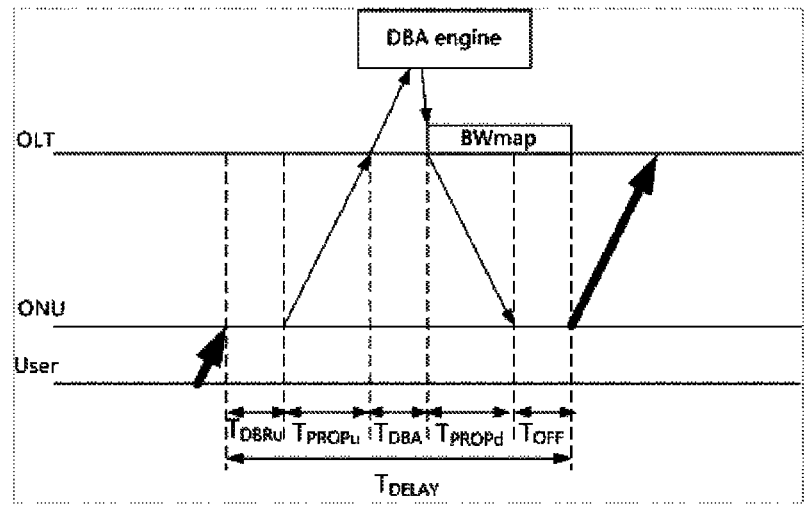
FIG. 3 is a schematic view of a delay caused by bandwidth allocation based on a bandwidth request.
Figure 4:
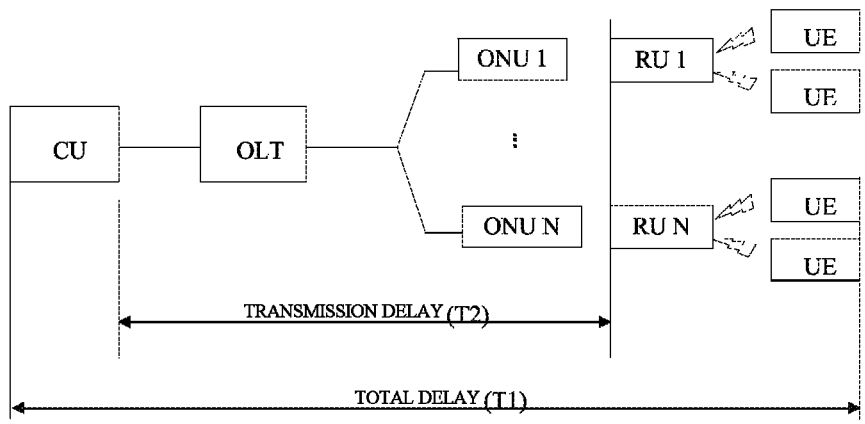
FIG. 4 is an example of mobile pre-transmission architecture applying a PON.
Figure 5:
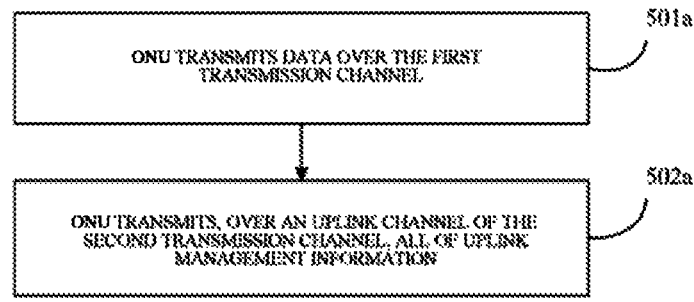
FIG. 5 is a first schematic view of implementation method process of the PON system of an embodiment of the present disclosure.
Figure 6:
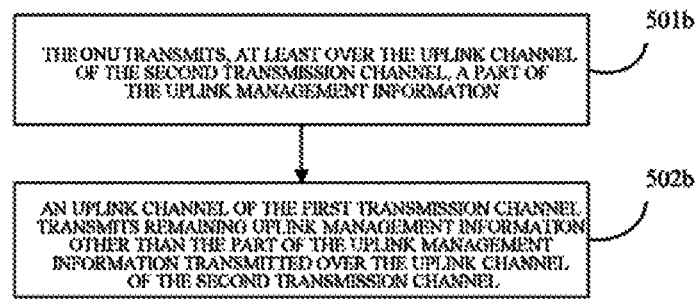
FIG. 6 is a second schematic view of implementation method process of the PON system of an embodiment of the present disclosure.

Based on the background technology, the transmission delay is briefly described in conjunction with a mobile pre-transmission architecture applying a PON. Based on consideration of functional separation, a traditional base station is divided into a remote unit (RU) and a central unit (CU). The PON can be used as a good system and technology for connecting RU and CU because the PON can be reduced optical fiber deployment, as shown in FIG. 4. In LTE and its evolution system, it is required that a total delay between the CU and a user equipment (UE) is less than 10 ms, and the total delay comprises a propagation delay between the CU and RU, as well as a processing delay of every device, and it is required that a transmission delay between the CU and the RU is less than 250 us. On the other hand, in a 5G mobile system, it is required that the overall delay is less than 4 ms. For the enhanced mobile broadband (eMBB) service, the transmission delay between the CU and the RU is required to be less than 100 us, and the processing delays of an OLT and an ONU are less than 10 us. Based on the strict requirements of the mobile network for the transmission delay, the embodiment of the present disclosure provides the following solutions:

An embodiment of the disclosure provides an implementation method of a PON system, wherein a first transmission channel and a second transmission channel are provided between an optical line terminal OLT and an optical network unit ONU in the PON system; as shown in FIGS. 5 and 6 the method comprises:

step 501a: the ONU transmits data over the first transmission channel;

step 502a: the ONU transmits, over an uplink channel of the second transmission channel, all of uplink management information.

step 501b: the ONU transmits, over the uplink channel of the second transmission channel, a part of the uplink management information;

step 502b: an uplink channel of the first transmission channel transmits remaining uplink management information other than the part of the uplink management information transmitted over the uplink channel of the second transmission channel.

Here, it should be noted that the execution order of steps 501 and 502 is not limited, and the order of the labels is merely for convenience of description.

The disclosure puts some or all of the interaction of the management information on the management channel, so that the bandwidth occupied by the interaction of the management information is stripped from the original data channel, so that the bandwidth utilization of the original data channel is higher, and the delay of sending data is smaller and more controllable.

Optionally, the method further comprises: the OLT transmits, over a downlink channel of the first transmission channel or a downlink channel of the second transmission channel, all downlink management information; or the OLT transmits, over the downlink channel of the second transmission channel, a part of the downlink management information, and transmits, over the downlink channel of the first transmission channel, remaining downlink management information other than the part of the downlink management information transmitted over the downlink channel of the second transmission channel.

It should be noted that when the downlink channel of the second transmission channel is consistent with the downlink channel of the first transmission channel (for example, the wavelengths are the same), data and management information are transmitted; when inconsistent, only management information is transmitted.

Figure 7:
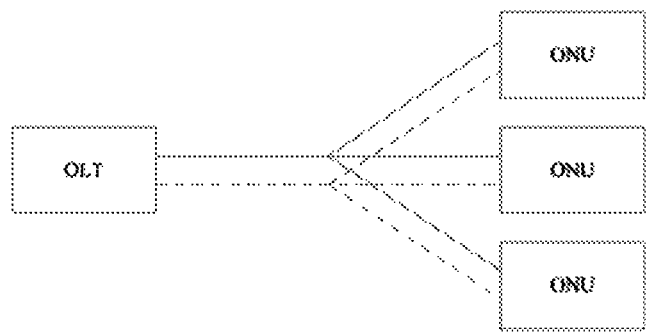
FIG. 7 is a schematic view of the PON architecture of an embodiment of the present disclosure.

In actual application, an additional management channel (i.e., the second transmission channel) may be established on the basis of the original PON architecture, and the additional management channel adopts at least a different uplink wavelength from other original channel (i.e., the first transmission channel) (i.e., downstream wavelength may be identical to other original channels). Further, a standard which is the same as or different from that of the original channels in original PON architecture is used for carrying part or all of the management information between the OLT and the ONU, and other interactions between the OLT and the ONU are still performed on the original data channel. As shown in FIG. 7, the solid line channel is the original data channel, the broken line channel is the new additional management channel.

In an embodiment of the disclosure, the management information includes but is not limited to the following information:

management information in an ONU discovering process;
management information in an ONU ranging process;
management information in bandwidth allocation;
optical network unit management control interface (OMCI) information, operation management and maintenance (OAM) information;
physical layer operation management and maintenance (PLOAM) information and multipoint control protocol (MPCP) information.

In an embodiment, a standard of the second transmission channel is different from or identical to a standard of the first transmission channel; or when the first transmission channel comprises a subchannel, the standard of the second transmission channel is the same as the standard of the subchannel of the first transmission channel; or when the first transmission channel comprises a plurality of subchannels, the second transmission channel is a subchannel in the first transmission channel for the ONU to transmit all or a part of the management information; remaining subchannels in the first transmission channel are used for the ONU to transmit data, or transmit the data and remaining management information other than the part of the management information transmitted to the OLT.

For example, the first transmission channel and the second transmission channel adopt the same standards which include but are not limited to the following:

both work under the gigabit passive optical network (GPON) standard;
or, both work under the ethernet passive optical network (EPON) standard;
or, both work under the 10GGPON standard;
or, both work under the 10GEPON standard;
or, both work under the 100GPON standard, and the second transmission channel is a 25G rate channel.

The first transmission channel and the second transmission channel adopt different standards which include but are not limited to the following:

the management channel works under the GPON standard, and the data channel works under the 10GGPON standard; or,
the management channel works under the GPON standard, and the data channel works under the 100GGPON standard; or,
the management channel works under the EPON standard, and the data channel works under the 10GEPON standard; or,
the management channel works under the GPON standard, and the data channel works under the 100GEPON standard.

the method for establishing and achieving the foregoing second transmission channel comprises, but is not limited to, adding a channel which has a different standard from that of the original data channel (the first transmission channel), or adding a channel which has the same standard as that of the original data channel, or adding a channel which has the same standard as that of a subchannel of the original data channel, or a subchannel of the original data channel is set as the management channel.

Alternatively, the method further comprises:

step 503: the OLT allocates periodic bandwidths for the ONU according to characteristics of service carried on the PON system, and a spacing between two adjacent bandwidths is less than or equal to a fixed value T.

In practical applications, the ONU can be allocated periodic bandwidths before the PON system operates.

In this embodiment, the characteristics of above services comprise, but are not limited to, data rate of carried service, data continuity of the carried service, and data interval of the carried service. The ONU obtains a bandwidth at regular intervals, and the interval between two adjacent bandwidths is less than or equal to a fixed value T, and the fixed value T brings a certain delay to the transmission of carried service data, and in each obtained bandwidth, the ONU may not be able to complete transmitting the data of the carried service and caching the data. Therefore, the setting of the fixed T should satisfy that although when the ONU transmits the data of the carried service its service characteristics are changed, for example, the data is cached and/or fragmented, etc., the data rate, the data continuity, and the data interval may change, but it should be able to ensure that the carried service characteristics may be restored on the OLT side, such as restoring the data rate, the data continuity, and the data interval of the carried services, etc.

Wherein the fixed value T is:

a difference value between a time t1 when traffic data arrives at the ONU and a time t2 when the ONU transmits processed traffic data to the OLT, and a time when the ONU processes traffic data is an upper time limit that the ONU processes traffic data, which is required to ensure completion of the service.

Here, since the interval between any two adjacent bandwidths does not exceed a fixed value, the bandwidths may be uniformly distributed linearly or uniformly distributed non-linearly. After determining the fixed value, the design of the fixed bandwidth allocation is performed.

It can be seen that the bandwidth allocation of the present disclosure is no longer dependent on ONU bandwidth request or the OLT monitoring traffic of the ONU, further reducing delay that the ONU transmitting data.

An embodiment of the present disclosure also provides a storage medium, which may be configured to store program codes for performing the above method steps. The storage medium may comprise, but are not limited to: a U-disk, a read-only memory (ROM), a random access memory (RAM), a removable hard disk, a magnetic disk or an optical disc and other mediums that may store program codes.

Figure 8:
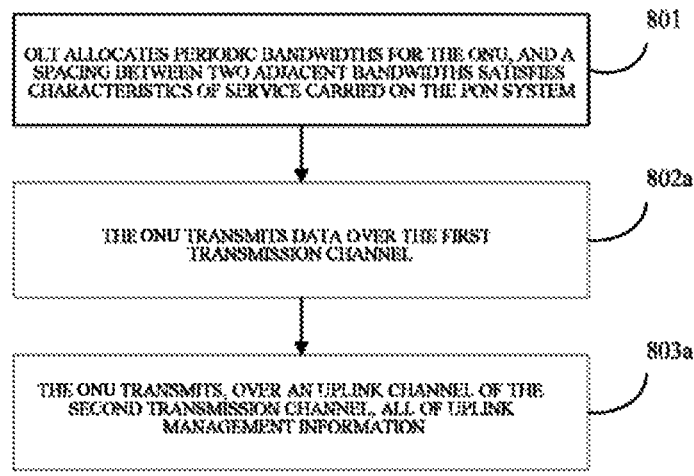
FIG. 8 is a third schematic view of implementation method process of the PON system of an embodiment of the present disclosure.
Figure 9:
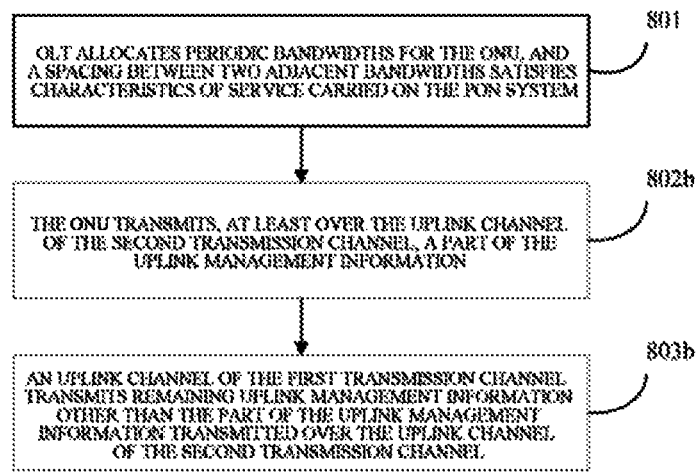
FIG. 9 is a fourth schematic view of implementation method process of the PON system of an embodiment of the present disclosure.

As shown in FIGS. 8 and 9, the present disclosure also provides an implementation method of a PON system, comprising:

step 801: an OLT allocates periodic bandwidths for an ONU according to characteristics of service carried on the PON system, and a spacing between two adjacent bandwidths is less than or equal to a fixed value T.

In practical applications, the ONU can be allocated periodic bandwidths before the PON system operates.

In this embodiment, the characteristics of above services comprise, but are not limited to, data rate of carried service, data continuity of the carried service, and data interval of the carried service. The ONU obtains a bandwidth at regular intervals, and the interval between two adjacent bandwidths is less than or equal to a fixed value T, and the fixed value T brings a certain delay to the transmission of carried service data, and in each obtained bandwidth, the ONU may not be able to complete transmitting the data of the carried service and caching the data. Therefore, the setting of the fixed T should satisfy that although when the ONU transmits the data of the carried service its service characteristics are changed, for example, the data is cached and/or fragmented, etc., the data rate, the data continuity, and the data interval may change, but it should be able to ensure that the carried service characteristics may be restored on the OLT side, such as restoring the data rate, the data continuity, and the data interval of the carried services, etc.

Wherein the fixed value T is:

a difference value between a time t1 when traffic data arrives at the ONU and a time t2 when the ONU transmits processed traffic data to the OLT, and a time when the ONU processes traffic data is an upper time limit that the ONU processes traffic data, which is required to ensure completion of the service.

Here, since the interval between any two adjacent bandwidths does not exceed a fixed value, the bandwidths may be uniformly distributed linearly or uniformly distributed non-linearly. After determining the fixed value, the design of the fixed bandwidth allocation is performed.

The bandwidth allocation of the present disclosure is no longer dependent on ONU bandwidth request or the OLT monitoring traffic of the ONU, further reducing delay that the ONU transmitting data.

In an embodiment, a first transmission channel and a second transmission channel are provided between an OLT and an ONU in the PON system; correspondingly, the method comprises:

step 802a: the ONU transmits data over the first transmission channel;

step 803a: the ONU transmits, over an uplink channel of the second transmission channel, all of uplink management information; or step 802b: the ONU transmits, over the uplink channel of the second transmission channel, a part of the uplink management information;

step 803b: an uplink channel of the first transmission channel transmits remaining uplink management information other than the part of the uplink management information transmitted over the uplink channel of the second transmission channel.

In the present disclosure, a part of or all of the management information is interacted on management channels such that the bandwidth occupied by the management information interaction is peeled from original data channel, so that bandwidth utilization the original data channel is higher, and delay of sending data is smaller and more controllable.

In an embodiment, the method further comprises: the OLT transmits, over a downlink channel of the first transmission channel or a downlink channel of the second transmission channel, all downlink management information; or the OLT transmits, over the downlink channel of the second transmission channel, a part of the downlink management information, and transmits, over the downlink channel of the first transmission channel, remaining downlink management information other than the part of the downlink management information transmitted over the downlink channel of the second transmission channel.

It should be noted that when the downlink channel of the second transmission channel is consistent with the downlink channel of the first transmission channel (for example, the wavelengths are the same), data and management information are transmitted; when inconsistent, only management information is transmitted.

In actual application, an additional management channel (i.e., the second transmission channel) may be established on the basis of the original PON architecture, and the additional management channel adopts at least a different uplink wavelength from other original channel (i.e., the first transmission channel) (i.e., downstream wavelength may be identical to other original channels). Further, a standard which is the same as or different from that of the original channels in original PON architecture is used for carrying part or all of the management information between the OLT and the ONU, and other interactions between the OLT and the ONU are still performed on the original data channel. As shown in FIG. 7, the solid line channel is the original data channel, the broken line channel is the new additional management channel.

In an embodiment of the disclosure, the management information includes but is not limited to the following information:

management information in a process of discovering ONU;

management information in an ONU ranging process;
management information in bandwidth allocation;
optical network unit management control interface (OMCI) information, operation management and maintenance (OAM) information;
physical layer operation management and maintenance (PLOAM) information and multipoint control protocol (MPCP) information.

In an embodiment of the disclosure, a standard of the second transmission channel is different from or identical to a standard of the first transmission channel; or when the first transmission channel comprises a subchannel, the standard of the second transmission channel is the same as the standard of the subchannel of the first transmission channel; or when the first transmission channel comprises a plurality of subchannels, the second transmission channel is a subchannel in the first transmission channel for the ONU to transmit all or a part of the management information; remaining subchannels in the first transmission channel are used for the ONU to transmit data, or transmit the data and remaining management information other than the part of the management information transmitted to the OLT.

For example, the first transmission channel and the second transmission channel adopt the same standards which include but are not limited to the following:
both work under the gigabit passive optical network (GPON) standard;
or, both work under the ethernet passive optical network (EPON) standard;
or, both work under the 10GGPON standard;
or, both work under the 10GEPON standard;
or, both work under the 100GPON standard, and the second transmission channel is a 25G rate channel.

The first transmission channel and the second transmission channel adopt different standards which include but are not limited to the following:
the management channel works under the GPON standard, and the data channel works under the 10GGPON standard; or,
the management channel works under the GPON standard, and the data channel works under the 100GGPON standard; or,
the management channel works under the EPON standard, and the data channel works under the 10GEPON standard; or,
the management channel works under the GPON standard, and the data channel works under the 100GEPON standard.

the method for establishing and achieving the foregoing second transmission channel comprises, but is not limited to, adding a channel which has a different standard from that of the original data channel (the first transmission channel), or adding a channel which has the same standard as that of the original data channel, or adding a channel which has the same standard as that of a subchannel of the original data channel, or a subchannel of the original data channel is set as the management channel.

An embodiment of the present disclosure also provides a storage medium, which may be configured to store program codes for performing the above method steps. The storage medium may comprise, but are not limited to: a U-disk, a read-only memory (ROM), a random access memory (RAM), a removable hard disk, a magnetic disk or an optical disc and other mediums that may store program codes.

Figure 10:
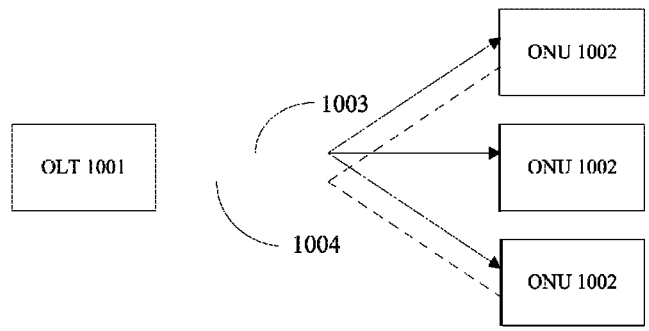
FIG. 10 is a schematic view of a structure of the PON system of an embodiment of the present disclosure.

An embodiment of the present disclosure also provides a PON system, wherein a first transmission channel 1003 and a second transmission channel 1004 are provided between an optical line terminal OLT 1001 and an optical network unit ONU 1002 in the PON system; as shown in FIG. 10, wherein, the first transmission channel is configured to transmit data by the ONU;

an uplink channel of the second transmission channel is configured to transmit all of uplink management information by the ONU; or an uplink channel of the first transmission channel is configured to transmit remaining uplink management information other than the part of the uplink management information transmitted over the uplink channel of the second transmission channel by the ONU;

the uplink channel of the second transmission channel is configured to transmit a part of uplink management information by the ONU.

In the present disclosure, a part of or all of the management information is interacted on management channels such that the bandwidth occupied by the management information interaction is peeled from original data channel, so that bandwidth utilization the original data channel is higher, and delay of sending data is smaller and more controllable.

In an embodiment, a downlink channel of the first transmission channel or a downlink channel of the second transmission channel are also used by the OLT to transmit all of downlink management information; or the downlink channel of the second transmission channel is also used by the OLT to transmit a part of downlink management information;

the downlink channel of the first transmission channel is also used by the OLT to transmit remaining downlink management information other than the part of the downlink management information transmitted over the downlink channel of the second transmission channel.

It should be noted that when the downlink channel of the second transmission channel is consistent with the downlink channel of the first transmission channel (for example, the wavelengths are the same), data and management information are transmitted; when inconsistent, only management information is transmitted.

In an embodiment, the management information includes but is not limited to the following information:
management information in an ONU discovering process;
management information in an ONU ranging process;
management information in bandwidth allocation;
optical network unit management control interface (OMCI) information, operation management and maintenance (OAM) information;
physical layer operation management and maintenance (PLOAM) information and multipoint control protocol (MPCP) information.

Wherein a standard of the second transmission channel is different from or identical to a standard of the first transmission channel; or when the first transmission channel comprises a subchannel, the standard of the second transmission channel is the same as the standard of the subchannel of the first transmission channel; or when the first transmission channel comprises a plurality of subchannels, the second transmission channel is a subchannel in the first transmission channel for the ONU to transmit all or a part of the management information; remaining subchannels in the first transmission channel are used for the ONU to transmit data, or transmit the data and remaining management information other than the part of the management information transmitted to the OLT.

For example, the first transmission channel and the second transmission channel adopt the same standards which include but are not limited to the following:

both work under the gigabit passive optical network (GPON) standard;

or, both work under the ethernet passive optical network (EPON) standard;

or, both work under the 10GGPON standard;

or, both work under the 10GEPON standard;

or, both work under the 100GPON standard, and the second transmission channel is a 25G rate channel.

The first transmission channel and the second transmission channel adopt different standards which include but are not limited to the following:

the management channel works under the GPON standard, and the data channel works under the 10GGPON standard; or, the management channel works under the GPON standard, and the data channel works under the 100GGPON standard; or, the management channel works under the EPON standard, and the data channel works under the 10GEPON standard; or, the management channel works under the GPON standard, and the data channel works under the 100GEPON standard.

the method for establishing and achieving the foregoing second transmission channel comprises, but is not limited to, adding a channel which has a different standard from that of the original data channel (the first transmission channel), or adding a channel which has the same standard as that of the original data channel, or adding a channel which has the same standard as that of a subchannel of the original data channel, or a subchannel of the original data channel is set as the management channel.

In an embodiment, the OLT is also used to allocate periodic bandwidths for the ONU according to characteristics of service carried on the PON system, and a spacing between two adjacent bandwidths is less than or equal to a fixed value T.

Wherein the fixed value T is:

a difference value between a time t1 when traffic data arrives at the ONU and a time t2 when the ONU transmits processed traffic data to the OLT, and a time when the ONU processes traffic data is an upper time limit that the ONU processes traffic data, which is required to ensure completion of the service.

Here, since the interval between any two adjacent bandwidths does not exceed a fixed value, the bandwidths may be uniformly distributed linearly or uniformly distributed non-linearly. After determining the fixed value, the design of the fixed bandwidth allocation is performed.

It can be seen that the bandwidth allocation of the present disclosure is no longer dependent on ONU bandwidth request or the OLT monitoring traffic of the ONU, further reducing delay that the ONU transmitting data.

An embodiment of the present disclosure also provides a PON system, wherein an OLT in the system is configured to allocate periodic bandwidths for an ONU according to characteristics of service carried on the PON system, and a spacing between two adjacent bandwidths is less than or equal to a fixed value T.

Wherein the fixed value T is:

a difference value between a time t1 when traffic data arrives at the ONU and a time t2 when the ONU transmits processed traffic data to the OLT, and a time when the ONU processes traffic data is an upper time limit that the ONU processes traffic data, which is required to ensure completion of the service.

In an embodiment, a first transmission channel and a second transmission channel are provided between an OLT and an ONU in the PON system; and wherein, the first transmission channel is configured to transmit data by the ONU;

an uplink channel of the second transmission channel is configured to transmit all of uplink management information by the ONU; or an uplink channel of the first transmission channel is configured to transmit remaining uplink management information other than the part of the uplink management information transmitted over the uplink channel of the second transmission channel by the ONU;

the uplink channel of the second transmission channel is configured to transmit a part of uplink management information by the ONU.

In an embodiment, a downlink channel of the first transmission channel or a downlink channel of the second transmission channel are also used by the OLT to transmit all of downlink management information; or the downlink channel of the second transmission channel is also used by the OLT to transmit a part of downlink management information;

the downlink channel of the first transmission channel is also used by the OLT to transmit remaining downlink management information other than the part of the downlink management information transmitted over the downlink channel of the second transmission channel.

It should be noted that when the downlink channel of the second transmission channel is consistent with the downlink channel of the first transmission channel (for example, the wavelengths are the same), data and management information are transmitted; when inconsistent, only management information is transmitted.

In an embodiment of the disclosure, the management information includes but is not limited to the following information:

management information in an ONU discovering process;

management information in an ONU ranging process;

management information in bandwidth allocation;

optical network unit management control interface (OMCI) information, operation management and maintenance (OAM) information;

physical layer operation management and maintenance (PLOAM) information and multipoint control protocol (MPCP) information.

In an embodiment of the disclosure, a standard of the second transmission channel is different from or identical to a standard of the first transmission channel; or when the first transmission channel comprises a subchannel, the standard of the second transmission channel is the same as the standard of the subchannel of the first transmission channel; or when the first transmission channel comprises a plurality of subchannels, the second transmission channel is a subchannel in the first transmission channel for the ONU to transmit all or a part of the management information; remaining subchannels in the first transmission channel are used for the ONU to transmit data, or transmit the data and remaining management information other than the part of the management information transmitted to the OLT.

For example, the first transmission channel and the second transmission channel adopt the same standards which include but are not limited to the following:

both work under the gigabit passive optical network (GPON) standard;

or, both work under the ethernet passive optical network (EPON) standard;

or, both work under the 10GGPON standard;

or, both work under the 10GEPON standard;

or, both work under the 100GPON standard, and the second transmission channel is a 25G rate channel.

The first transmission channel and the second transmission channel adopt different standards which include but are not limited to the following:

the management channel works under the GPON standard, and the data channel works under the 10GGPON standard; or, the management channel works under the GPON standard, and the data channel works under the 100GGPON standard; or, the management channel works under the EPON standard, and the data channel works under the 10GEPON standard; or, the management channel works under the GPON standard, and the data channel works under the 100GEPON standard.

the method for establishing and achieving the foregoing second transmission channel comprises, but is not limited to, adding a channel which has a different standard from that of the original data channel (the first transmission channel), or adding a channel which has the same standard as that of the original data channel, or adding a channel which has the same standard as that of a subchannel of the original data channel, or a subchannel of the original data channel is set as the management channel.

In practical application, the function of the OLT in an embodiment of the present disclosure may be achieved by a processor in the OLT, may also be achieved by a specific logic circuit; for example, in practical application, may be achieved by a central processor unit (CPU), a microprocessor unit (MPU), a digital signal processor (DSP), or a field programmable gate array (FPGA) and the like located at the OLT.

It should be noted here that the description of embodiment items of the above device is similar to the above method description, and has the same beneficial effects as the method embodiments, and therefore will not be described again. For the technical details that are not disclosed in the embodiments of the present disclosure, those skilled in the art should refer to the description of the method embodiments of the present disclosure, and the details are not described herein.

The present disclosure will be described in detail below with reference to specific embodiments. It should be noted that the following additional management channel is the above-mentioned second transmission channel, and the original data channel is the above-mentioned first transmission channel.

Embodiment 1

This embodiment transplants the ONU registration and activation processes such as the ONU discovering, the ONU ranging to an additional management channel, comprising following steps:

step 1: the OLT periodically opens a quiet window on the additional management channel and sends an SN request;

step 2: when a new ONU needs to be online, the ONU waits for the quiet window opened by the OLT on the additional management channel and captures the SN request, and then competes to send the SN in the quiet window;

step 3: the OLT acquires an SN of a new ONU on the additional management channel;

step 4: the OLT allocates an ONU-ID to the new ONU on the additional management channel, and continues to open a ranging window, and sends a ranging request to the ONU;

step 5: the ONU sends a ranging response on the additional management channel;

step 6: the OLT obtains the ranging response, calculates a ranging result of the additional management channel, and sends the ranging result to the ONU through the additional management channel, and calculates a ranging result of an original data channel, and sends the ranging result to the ONU through the original data channel;

step 7: after receiving the two ranging results, the ONU enters the working state;

step 8: the OLT and the ONU continue to adjust the ranging result in the working state on the original data channel;

Here, adjusting the ranging result is that: the OLT allocates bandwidth to the ONU on the original data channel, the OLT monitors arrival time of an uplink burst sent by the ONU on the original data channel, compares with an expected arrival time of bandwidth allocation, and adjusts the ranging result of the ONU on the original data channel.

Figure 11:
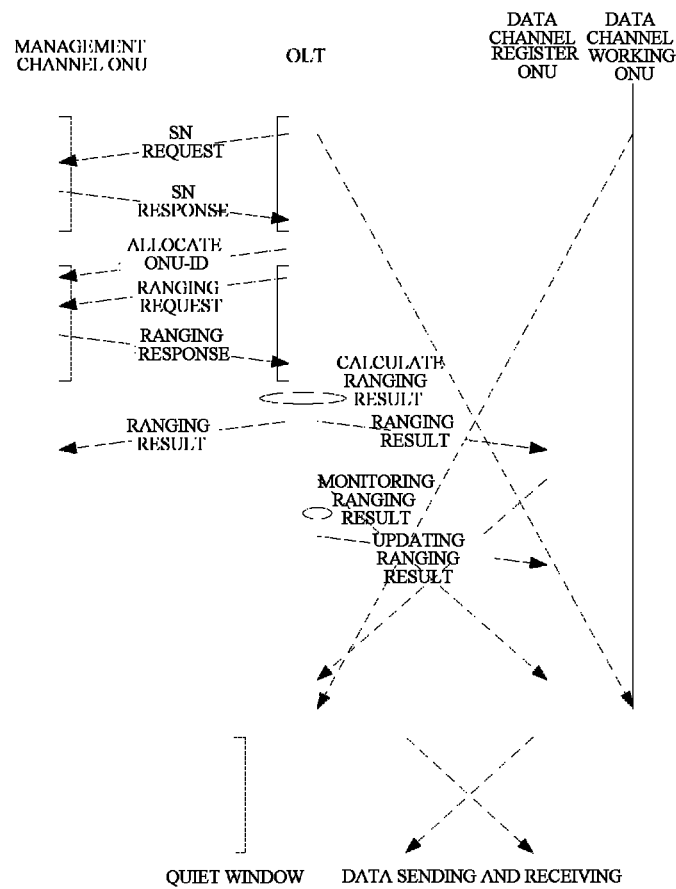
FIG. 11 is a schematic view of a working principle and process of LD-PON of a first embodiment of the present disclosure.

The above-described process is shown in FIG. 11.

On the original data channel, compared with the prior art, it is not necessary to perform the ONU discovering and ONU ranging process, but directly enters the working state after receiving the ranging result.

It should be noted that light is transmitted in an optical fiber, and the length of the optical fiber is constant, but the transmission of light in the optical fiber is performed by refraction/reflection, and is not linear transmission. Different wavelengths of light have different refractive index/reflectivity in the optical fiber, and the time of transmission in the same length of fiber is different, but as long as the transmission time of one wavelength of light in the fiber is known, if the transmission time of another wavelength needs to be calculated, it can be calculated by the refractive index/reflectivity of the two wavelengths of light.

In an embodiment of the present disclosure, the ranging result of the original data channel is calculated, the refractive index/reflectivity of the wavelength is adopted according to the additional management channel, and the refractive index/reflectivity of the wavelength and the ranging result of the additional management channel (i.e., the round-trip transmission time of the additional management channel) are adopted by the original data channel, the ranging result on the original data channel can be calculated. In addition, the rate of the additional management channel and the rate of the original data channel may be different, and the rate factor should be considered).

For example, the additional management channel and the data channel adopt the same standard, and only the wavelengths are different. The ranging result obtained on the additional management channel, i.e., the round-trip transmission time, is the RTT, the downlink wavelength is $\lambda D1$, the refractive index is ND1, and the uplink wavelength is $\lambda U1$, the refractive index is NU1, and the downlink wavelength of the data channel is $\lambda D2$, the refractive index is ND2, the uplink wavelength is $\lambda U2$, and the refractive index is NU2, thus data channel ranging result, i.e., the round-trip time, is RTT×(ND2+NU2)/(ND1+NU1). If the ranging result, i.e., the round-trip transmission time, is expressed by the number of bits, the ranging result on the additional management channel is first divided by the rate so as to transform into time, and then the above formula is used to calculate the ranging result represented by time on the data channel, and then is multiplied by the rate on the data channel so as to transform into the ranging result expressed by the number of bits.

The specific implementation of the ranging result on the other paths calculated according to the wavelength value is not limited in the present disclosure, and the implementation manner is not limited to the scope of protection of the present disclosure, and details are not described herein again.

Embodiment 2

Figure 12:
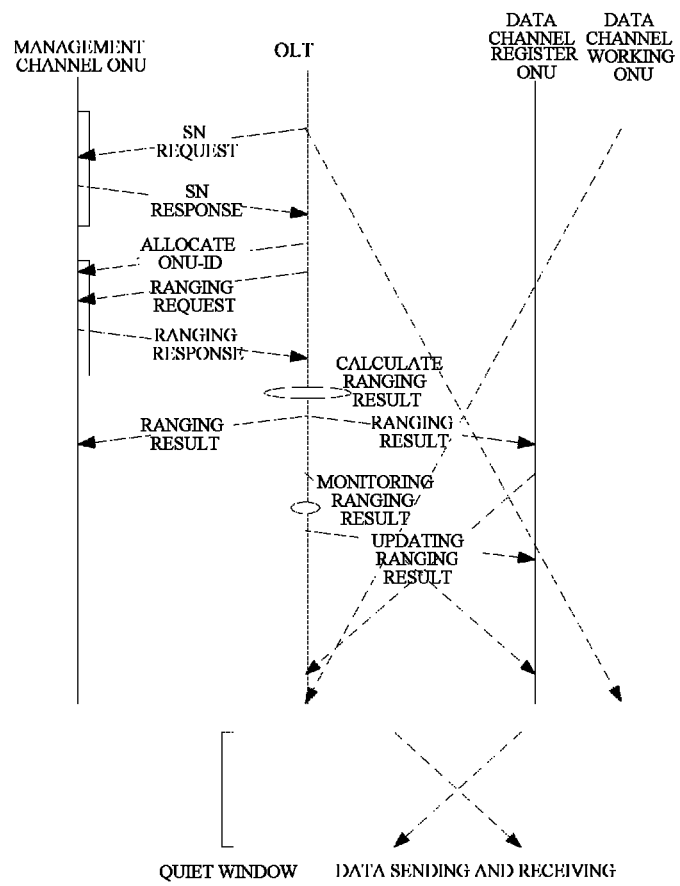
FIG. 12 is a schematic view of a working principle and process of LD-PON of a second embodiment of the present disclosure.

Based on the embodiment 1, the composition of the management channel is modified. The downlink wavelength of the management channel is still the same as the downlink wavelength of the original data channel. The uplink wavelength adopted by the management channel is different from the uplink wavelength of the original data channel. The standard of the management channel is the same as the standard of the original data channel, as shown in FIG. 12. Compared with the embodiment 1, the embodiment 2 can save one downlink wavelength resource. Comprising the following:

step 1: the OLT periodically opens a quiet window on the additional management channel and sends an SN request from the original data channel;

step 2: when a new ONU needs to be online, the ONU waits for the quiet window opened by the OLT on the additional management channel and captures the SN request sent on the original data channel, and then competes to send the SN in the quiet window on the additional management channel;

step 3: the OLT acquires an SN of a new ONU on the additional management channel;

step 4: the OLT allocates an ONU-ID to the new ONU on the original data channel, and continues to open a ranging window on the additional management channel, and sends a ranging request to the ONU on the original data channel;

step 5: the ONU sends a ranging response on the additional management channel;

step 6: the OLT obtains the ranging response on the additional management channel, calculates a ranging result of the additional management channel, and sends the ranging result to the ONU through the additional management channel, and calculates a ranging result of an original data channel, and sends the ranging result to the ONU on the original data channel;

The calculating the ranging result of the original data channel comprises: an uplink wavelength adopted by the additional management channel, and a downlink and an uplink wavelengths adopted by the original data channel, and the ranging result on the original data channel can be calculated by a correlated wavelength formula according to the ranging result of the additional management channel. In addition, the rates of the additional management channel and the original data channel may be different, and rate factors also need to be considered.

step 7: after receiving the two ranging results, the ONU enters the working state;

step 8: the OLT and the ONU continue to adjust the ranging result in the working state on the original data channel;

The continuing to adjust the ranging result comprises: the OLT allocates bandwidth to the ONU on the original data channel, the OLT monitors arrival time of an uplink burst sent by the ONU on the original data channel, compares with an expected arrival time of bandwidth allocation, and adjusts the ranging result of the ONU on the original data channel.

Embodiment 3

Based on embodiment 1, in the present embodiment, besides transplanting an ONU registration procedure such as the ONU discovering, the ONU ranging, etc., to the additional management channel, interaction of management information such as DBA allocation (BWmap/grant), a bandwidth request DBRu/REPORT, physical layer management information, PLOAM/MPCP, application layer management information OMCI/OAM is also transplanted to the additional management channel. Wherein the bandwidth mapping (BWmap), the DBRu, the PLOAM, the OMCI and the like are applied to the ITU-TPON series standards such as the GPON, the 10GGPON, etc.; the grant, the REPORT, the MPCP, the OAM and the like are applied to IEEE PON series standards.

ONU registration activation process is provided as follow, which is consistent with the embodiment 1:

step 1: the OLT periodically opens a quiet window on the additional management channel and sends an SN request;

step 2: when a new ONU needs to be online, the ONU waits for the quiet window opened by the OLT on the additional management channel and captures the SN request, and then competes to send the SN in the quiet window;

step 3: the OLT acquires an SN of a new ONU on the additional management channel;

step 4: the OLT allocates an ONU-ID to the new ONU on the additional management channel, and continues to open a ranging window, and sends a ranging request to the ONU;

step 5: the ONU sends a ranging response on the additional management channel;

step 6: the OLT obtains the ranging response, calculates a ranging result of the additional management channel, and sends the ranging result to the ONU through the additional management channel, and calculates a ranging result of an original data channel, and sends the ranging result to the ONU through the original data channel;

Specifically, the calculating the ranging result of the original data channel is: a wavelength adopted by the additional management channel, and a wavelength adopted by the original data channel, and the ranging result on the original data channel can be calculated by a correlated wavelength formula according to the ranging result of the additional management channel. In addition, the rates of the additional management channel and the original data channel may be different, and rate factors also need to be considered.

step 7: after receiving the two ranging results, the ONU enters the working state;

step 8: the OLT and the ONU continue to adjust the ranging result in the working state on the original data channel;

The adjusting the ranging result is that: the OLT allocates bandwidth to the ONU on the original data channel, the OLT monitors arrival time of an uplink burst sent by the ONU on the original data channel, compares with an expected arrival time of bandwidth allocation, and adjusts the ranging result of the ONU on the original data channel.

Embodiment 4

A PON evolution strategy:
step 1: deploy GPON and run user services first;
step 2: when the deployment of the GPON cannot meet the user growth, deploying 10GGPON in the same ODN, that is, replacing an OLT side device, while supporting the GPON and the 10GGPON on the OLT side, and the originally deployed GPON ONU is gradually replaced as an ONU which supports both the GPON and the 10GGPON, and when the replacement of the original GPONs are not completed, the GPON ONUs and the 10GGPONONUs work separately, and do not affect each other. When all of the GPON ONUs are replaced, the 10GGPONONUs start the GPON channels, and the GPON channels exist as the management channels of the 10GGPONs.

After the evolution is completed, each GPON is used as the additional management channel, and each 10GGPON is used as the data channel. The operation can be performed in the manner of the embodiment 1 or the embodiment 3.

Of course, in the PON evolution strategy, it may be, but not limited to, GPON to 100GGPON evolution, EPON to 10GEPON evolution, EPON to 100GEPON evolution, and the like.

The following embodiments 5 and 6 will describe in detail the use of fixed allocation bandwidth to solve the PON transmission delay problem.

Embodiment 5

The OLT regularly allocates a periodic bandwidth to the ONU on the working channel. The maximum delay of the ONU uplink transmission is the time interval between the two bandwidth allocations.

Figure 13:
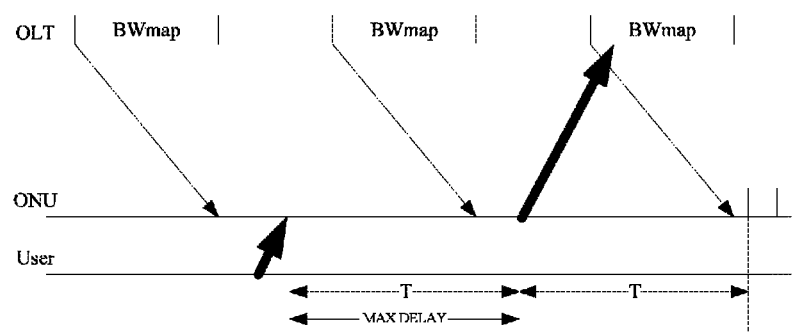
FIG. 13 is a schematic view showing that an OLT allocates periodic bandwidths for single ONU under the 10GGPON standard.

FIG. 13 shows that the OLT regularly allocates a periodic bandwidth to a single channel ONU, for example, under the 10GGPON standard, the bandwidth allocated by the OLT to the ONU is periodic, the time interval between two adjacent bandwidths is equal, and the maximum delay for the ONU to send uplink data is the time interval between two adjacent bandwidth allocations.

Figure 14:
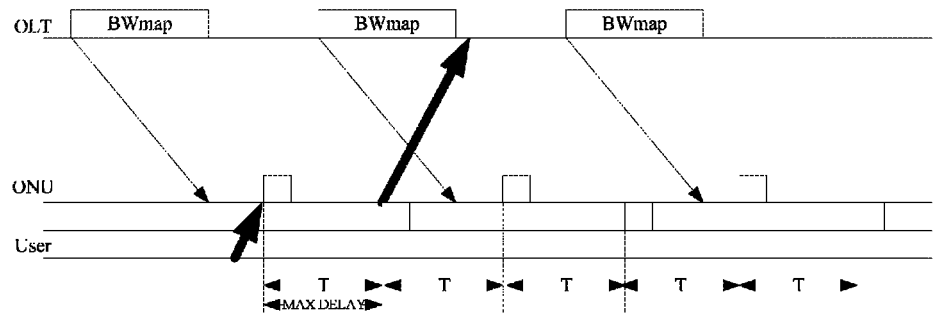
FIG. 14 is a schematic view showing that the OLT allocates periodic bandwidths for a multi-channel ONU under the multi-channel NG-PON2 standard.

FIG. 14 shows that the OLT allocates periodic bandwidth to the multi-channel ONU, such as a multi-channel NG-PON2, distributes the bandwidth obtained by the ONU on multiple channels to a time axis. The time interval between every two adjacent bandwidths is the same. The time interval is the maximum delay for the ONU to send uplink data.

Figure 15:
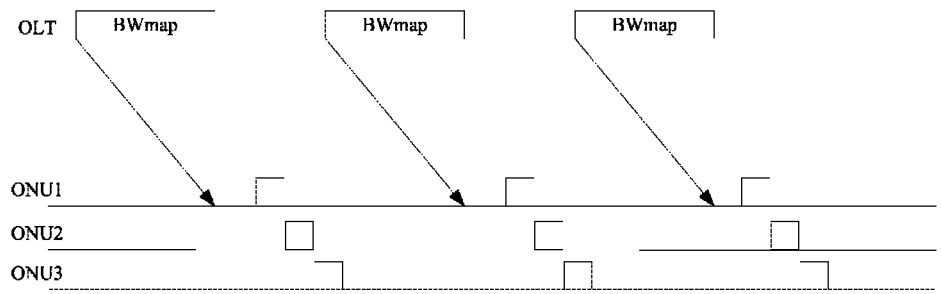
FIG. 15 is a schematic view of the bandwidth allocation method in 10GGPON.

Based on FIG. 13, further as shown in FIG. 15, in the 10GGPON system, the OLT regularly allocates periodic bandwidth to a plurality of ONU through the BWmap of each downlink frame, and the bandwidth allocations of the plurality of ONU are not overlapped with each other but cross each other.

Figure 16:
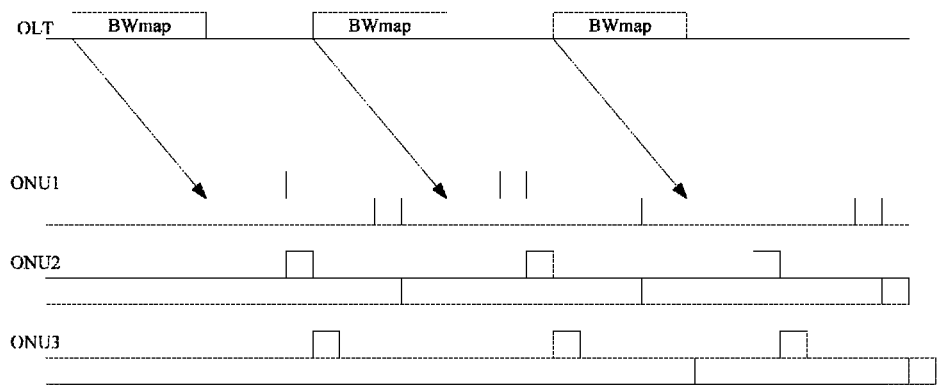

Similarly, based on FIG. 14, as shown in FIG. 16, in multi-channel binding systems such as the multi-channel NG-PON2, the 40GGPON, the 100GPON system, etc., the OLT regularly allocates periodic bandwidth to a plurality of channels of each ONU through each downlink BWmap, and and the bandwidth allocations of the plurality of ONU are not overlapped with each other but cross each other, and the bandwidth allocations on multiple channels of the same ONU do not overlap each other but form a fixed interval.

Embodiment 6

The OLT allocates fixed bandwidth to the ONU on a working channel, in the bandwidth allocated to the ONU, the time interval between adjacent two bandwidths does not exceed T, then the maximum delay of the ONU uplink transmission is T.

Figure 17:
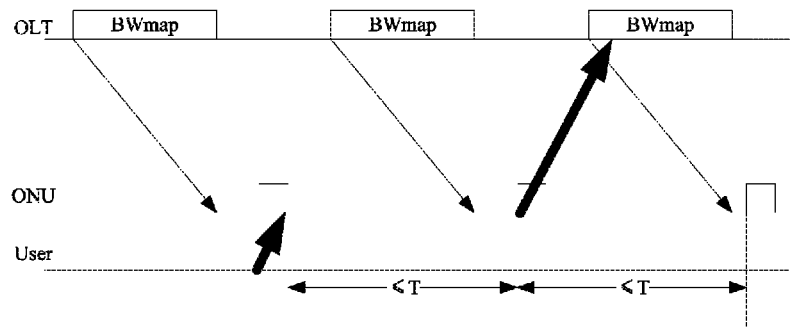
FIG. 17 is a schematic view showing that an OLT allocates periodic bandwidths for single ONU under the 10GGPON standard.

FIG. 17 shows that the OLT regularly allocates a bandwidth to a single channel ONU, for example under the 10GGPON standard, the bandwidth that the OLT allocates to the ONU, the time interval between adjacent two bandwidths does not exceed T, and the maximum delay that the ONU sends uplink data is T.

Figure 18:
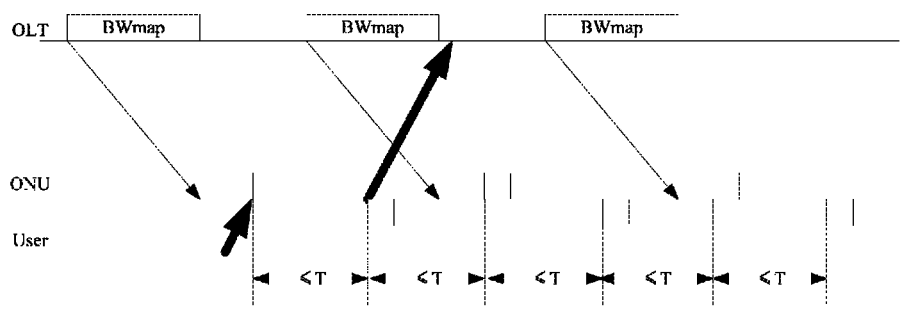
FIG. 18 is a schematic view showing that the OLT allocates periodic bandwidths for a multi-channel ONU under the multi-channel NG-PON2 standard.

FIG. 18 shows that the OLT regularly allocates a bandwidth to a multi-channel ONU, such as the multi-channel NG-PON2, distributes the bandwidth obtained by the ONU on multiple channels to a time axis. The time interval between every two adjacent bandwidths is the same. The time interval is the maximum delay for the ONU to send uplink data.

Figure 19:
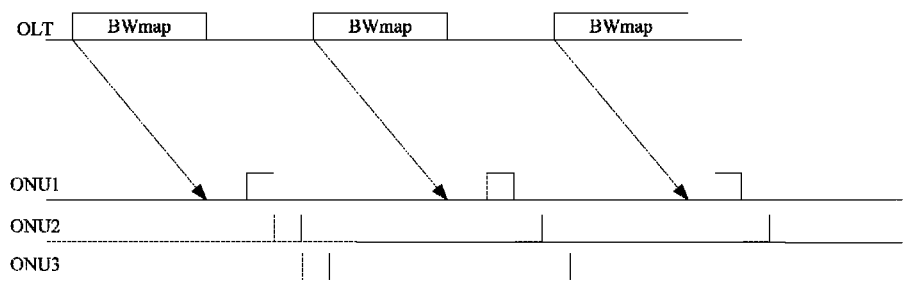
FIG. 19 is a schematic view of the bandwidth allocation in 10GGPON.

Based on FIG. 17, further as shown in FIG. 19, in the 10GGPON system, the OLT regularly allocates bandwidth to a plurality of ONU through the BWmap of each downlink frame, and the bandwidth allocations of the plurality of ONU are not overlapped with each other but cross each other.

Figure 20:
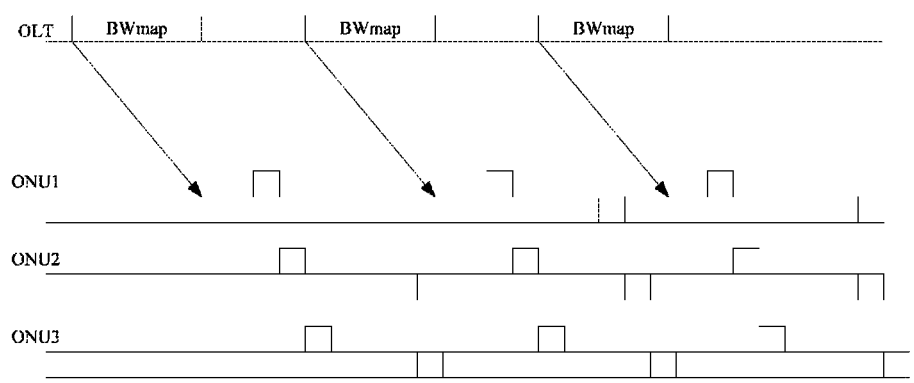

Similarly, based on FIG. 18, as shown in FIG. 20, in multi-channel binding systems such as the multi-channel NG-PON2, the 40GGPON, the 100GPON system, etc., the OLT regularly allocates bandwidth to a plurality of channels of each ONU through each downlink BWmap, and and the bandwidth allocations of the plurality of ONU are not overlapped with each other but cross each other, and the bandwidth allocations on multiple channels of the same ONU do not overlap each other but form a fixed interval.

It should be noted that when only the additional management channel (the second transmission channel) is established, the mobile bearing delay cannot be satisfied, or when only allocating the fixed bandwidth cannot satisfy the mobile bearing delay, the additional management channel and the fixed allocated bandwidth can be simultaneously adopted. For example, in this embodiment, embodiment 1 and embodiment 5, embodiment 1 and embodiment 6, embodiment 2 and embodiment 5, embodiment 2 and embodiment 6, embodiment 3 and embodiment 5, embodiment 3 and embodiment 6, embodiment 4 and embodiment 5, embodiment 4 and embodiment 6 are combined respectively. Of course, other embodiments for establishing additional management channels, other embodiments for fixed allocation of bandwidth, and related combinations or combinations with the embodiments herein are not excluded, and will not be further described herein.

While the embodiments of the present disclosure have been described above, the described embodiments are merely for the purpose of understanding the disclosure and are not intended to limit the disclosure. Any skilled in the art, without departing from the spirit and scope of the disclosed disclosure, can make any modifications and variations in the form and details of implementation, but the patent protection scope of the present disclosure is still subject to the scope defined by the appended claims.

INDUSTRIAL APPLICABILITY

In the embodiments of the present disclosure, the optical line terminal (OLT) and the optical network unit (ONU) of the PON system comprise the first transmission channel and the second transmission channel; the method comprises: the ONU transmits data over the first transmission channel; the ONU transmits, over an uplink channel of the second transmission channel, all of uplink management information; or the ONU transmits, over the uplink channel of the second transmission channel, a part of the uplink management information, and transmits, over an uplink channel of the first transmission channel, remaining uplink management information other than the part of the uplink management information transmitted over the uplink channel of the second transmission channel. In the present disclosure, a part of or all of the management information is interacted on management channels such that the bandwidth occupied by the management information interaction is peeled from original data channel, so that bandwidth utilization the original data channel is higher, and delay of sending data is smaller and more controllable.

What is claimed is:

1. A method for implementing a passive optical network (PON) system, wherein a first transmission channel and a second transmission channel are provided between an optical line terminal (OLT) and an optical network unit (ONU) in the PON system, and an uplink wavelength of the first transmission channel is different from an uplink wavelength of the second transmission channel; and the method comprises:

the ONU transmits data over the first transmission channel;

the ONU transmits, over an uplink channel of the second transmission channel, a part of the uplink management information, and transmits, over an uplink channel of the first transmission channel, remaining uplink management information other than the part of the uplink management information transmitted over the uplink channel of the second transmission channel.

2. The method for implementing the PON system according to claim 1, wherein the method further comprises:

the OLT transmits, over a downlink channel of the first transmission channel or a downlink channel of the second transmission channel, all downlink management information; or the OLT transmits, over the downlink channel of the second transmission channel, a part of the downlink management information, and transmits, over the downlink channel of the first transmission channel, remaining downlink management information other than the part of the downlink management information transmitted over the downlink channel of the second transmission channel.

3. The method for implementing the PON system according to claim 1, wherein the management information includes but is not limited to the following information:

management information in an optical network unit (ONU) discovering process;

management information in an ONU ranging process;

management information in bandwidth allocation;

optical network unit management control interface (OMCI) information, operation management and maintenance (OAM) information;

physical layer operation management and maintenance (PLOAM) information and multipoint control protocol (MPCP) information.

4. The method for implementing the PON system according to claim 1, wherein a standard of the second transmission channel is different from or identical to a standard of the first transmission channel; or when the first transmission channel comprises a subchannel, the standard of the second transmission channel is the same as the standard of the subchannel of the first transmission channel.

5. The method for implementing the PON system according to claim 1, wherein the method further comprises:

the OLT allocates periodic bandwidths for the ONU according to characteristics of service carried on the PON system, and a spacing between two adjacent bandwidths is less than or equal to a fixed value T, wherein the fixed value T is:

a difference value between a time $t1$ when traffic data arrives at the ONU and a time $t2$ when the ONU transmits processed traffic data to the OLT, and a time when the ONU processes traffic data is an upper time limit that the ONU processes traffic data, which is required to ensure completion of the service.

6. A method for implementing a passive optical network (PON) system, the method comprising:

an OLT allocates periodic bandwidths for an ONU according to characteristics of service carried on the PON system, and a spacing between two adjacent bandwidths is less than or equal to a fixed value T, wherein the fixed value T is a maximum delay that the ONU sends uplink data and is set according to the characteristics of the service.

7. The method for implementing the PON system according to claim 6, wherein the fixed value T is:

a difference value between a time $t1$ when traffic data arrives at the ONU and a time $t2$ when the ONU transmits processed traffic data to the OLT, and a time when the ONU processes traffic data is an upper time limit that the ONU processes traffic data, which is required to ensure completion of the service.

8. The method for implementing the PON system according to claim 6, wherein a first transmission channel and a second transmission channel are provided between an OLT and an ONU in the PON system; and the method comprises:

the ONU transmits data over the first transmission channel;

the ONU transmits, over an uplink channel of the second transmission channel, all of uplink management information; or the ONU transmits, over the uplink channel of the second transmission channel, a part of the uplink management information, and transmits, over an uplink channel of the first transmission channel, remaining uplink management information other than the part of the uplink management information transmitted over the uplink channel of the second transmission channel, wherein the management information includes but is not limited to the following information:

management information in an optical network unit (ONU) discovering process;

management information in an ONU ranging process;

management information in bandwidth allocation;

optical network unit management control interface (OMCI) information, operation management and maintenance (OAM) information;

physical layer operation management and maintenance (PLOAM) information and multipoint control protocol (MPCP) information.

9. The method for implementing the PON system according to claim 8, wherein the method further comprises:

the OLT transmits, over a downlink channel of the first transmission channel or a downlink channel of the second transmission channel, all downlink management information; or the OLT transmits, over the downlink channel of the second transmission channel, a part of the downlink management information, and transmits, over the downlink channel of the first transmission channel, remaining downlink management information other than the part of the downlink management information transmitted over the downlink channel of the second transmission channel.

10. The method for implementing the PON system according to claim 8, wherein a standard of the second transmission channel is different from or identical to a standard of the first transmission channel; or
when the first transmission channel comprises a subchannel, the standard of the second transmission channel is the same as the standard of the subchannel of the first transmission channel; or
when the first transmission channel comprises a plurality of subchannels, the second transmission channel is a subchannel in the first transmission channel for the OLT to transmit all or a part of the management information; remaining subchannels in the first transmission channel are used for the OLT to transmit data, or transmit the data and remaining management information other than the part of the management information transmitted to the OLT.

11. A passive optical network (PON) system, wherein a first transmission channel and a second transmission channel are provided between an optical line terminal (OLT) and an optical network unit ONU in the PON system, and an uplink wavelength of the first transmission channel is different from an uplink wavelength of the second transmission channel; and wherein,
the first transmission channel is configured to transmit data by the ONU;
an uplink channel of the second transmission channel is configured to transmit a part of uplink management information by the ONU;
an uplink channel of the first transmission channel is configured to transmit remaining uplink management information other than the part of the uplink management information transmitted over the uplink channel of the second transmission channel by the ONU.

12. The PON system according to claim 11, wherein,
a downlink channel of the first transmission channel or a downlink channel of the second transmission channel are also used by the OLT to transmit all of downlink management information; or
the downlink channel of the second transmission channel is also used by the OLT to transmit a part of downlink management information;
the downlink channel of the first transmission channel is also used by the OLT to transmit remaining downlink management information other than the part of the downlink management information transmitted over the downlink channel of the second transmission channel.

13. The PON system according to claim 11, wherein the management information includes but is not limited to the following information:
management information in an optical network unit (ONU) discovering process;
management information in an ONU ranging process;
management information in bandwidth allocation;
optical network unit management control interface (OMCI) information, operation management and maintenance (OAM) information;
physical layer operation management and maintenance (PLOAM) information and multipoint control protocol (MPCP) information.

14. The PON system according to claim 11, wherein
a standard of the second transmission channel is different from or identical to a standard of the first transmission channel; or
when the first transmission channel comprises a subchannel, the standard of the second transmission channel is the same as the standard of the subchannel of the first transmission channel.

15. The PON system according to claim 11, wherein
the OLT is also used to allocate periodic bandwidths for the ONU according to characteristics of service carried on the PON system, and a spacing between two adjacent bandwidths is less than or equal to a fixed value T, wherein the fixed value T is:
a difference value between a time t1 when traffic data arrives at the ONU and a time t2 when the ONU transmits processed traffic data to the OLT, and a time when the ONU processes traffic data is an upper time limit that the ONU processes traffic data, which is required to ensure completion of the service.

16. A PON system, wherein an OLT in the system is configured to allocate periodic bandwidths for an ONU according to characteristics of service carried on the PON system, and a spacing between two adjacent bandwidths is less than or equal to a fixed value T, wherein the fixed value T is a maximum delay that the ONU sends uplink data and is set according to the characteristics of the service.

17. The PON system according to claim 16, wherein the fixed value T is:
a difference value between a time t1 when traffic data arrives at the ONU and a time t2 when the ONU transmits processed traffic data to the OLT, and a time when the ONU processes traffic data is an upper time limit that the ONU processes traffic data, which is required to ensure completion of the service.

18. The PON system according to claim 17, wherein a first transmission channel and a second transmission channel are provided between an OLT and an ONU in the PON system; and wherein,
the first transmission channel is configured to transmit data by the ONU;
an uplink channel of the second transmission channel is configured to transmit all of uplink management information by the ONU; or
an uplink channel of the first transmission channel is configured to transmit remaining uplink management information other than a part of the uplink management information transmitted over the uplink channel of the second transmission channel by the ONU;
the uplink channel of the second transmission channel is configured to transmit the part of uplink management information by the ONU,
wherein, the management information includes but is not limited to the following information:
management information in an optical network unit (ONU) discovering process;
management information in an ONU ranging process;
management information in bandwidth allocation;
optical network unit management control interface (OMCI) information, operation management and maintenance (OAM) information;
physical layer operation management and maintenance (PLOAM) information and multipoint control protocol (MPCP) information.

19. The PON system according to claim 18, wherein,
a downlink channel of the first transmission channel or a downlink channel of the second transmission channel are also used by the OLT to transmit all of downlink management information; or the downlink channel of the second transmission channel is also used by the OLT to transmit a part of downlink management information;

the downlink channel of the first transmission channel is also used by the OLT to transmit remaining downlink management information other than the part of the downlink management information transmitted over the downlink channel of the second transmission channel.

20. The PON system according to claim 18, wherein, a standard of the second transmission channel is different from or identical to a standard of the first transmission channel; or when the first transmission channel comprises a subchannel, the standard of the second transmission channel is the same as the standard of the subchannel of the first transmission channel; or when the first transmission channel comprises a plurality of subchannels, the second transmission channel is a subchannel in the first transmission channel for the OLT to transmit all or a part of the management information; remaining subchannels in the first transmission channel are used for the OLT to transmit data, or transmit the data and remaining management information other than the part of the management information transmitted to the OLT.

* * * * *

UNITED STATES PATENT AND TRADEMARK OFFICE
CERTIFICATE OF CORRECTION

PATENT NO. : 10,798,473 B2
APPLICATION NO. : 16/465904
DATED : October 6, 2020
INVENTOR(S) : Weiliang Zhang et al.

It is certified that error appears in the above-identified patent and that said Letters Patent is hereby corrected as shown below:

In the Claims

Column 23, Lines 26 and 27, the term reading -a part of the uplink management information- should read --a part of uplink management information--

Column 23, Lines 53-58, the term reading -optical network unit management control interface (OMCI) information, operation management and maintenance (OAM) information; physical layer operation management and maintenance (PLOAM) information and multipoint control protocol (MPCP) information- should read --optical network unit management control interface (OMCI) information or operation management and maintenance (OAM) information; physical layer operation management and maintenance (PLOAM) information or multipoint control protocol (MPCP) information--

Column 23, Lines 61-63, the term reading -a standard of the second transmission channel is different from or identical to a standard of the first transmission channel; or- should read --a standard of the second transmission channel is different from a standard of the first transmission channel; or--

Column 24, Lines 53-58, the term reading -optical network unit management control interface (OMCI) information, operation management and maintenance (OAM) information; physical layer operation management and maintenance (PLOAM) information and multipoint control protocol (MPCP) information- should read --optical network unit management control interface (OMCI) information or operation management and maintenance (OAM) information; physical layer operation management and maintenance (PLOAM) information or multipoint control protocol (MPCP) information--

Column 25, Lines 7-9, the term reading -a standard of the second transmission channel is different from or identical to a standard of the first transmission channel; or- should read --a standard of the second transmission channel is different from a standard of the first transmission channel; or--

Column 25, Lines 62-67, the term reading -optical network unit management control interface (OMCI) information, operation management and maintenance (OAM) information; physical layer operation management and maintenance (PLOAM) information and multipoint control protocol (MPCP)

Signed and Sealed this
Sixteenth Day of April, 2024

Katherine Kelly Vidal
*Director of the United States Patent and Trademark Office* information- should read --optical network unit management control interface (OMCI) information or operation management and maintenance (OAM) information; physical layer operation management and maintenance (PLOAM) information or multipoint control protocol (MPCP) information--

Column 26, Lines 2-4, the term reading -a standard of the second transmission channel is different from or identical to a standard of the first transmission channel; or- should read --a standard of the second transmission channel is different from a standard of the first transmission channel; or--

Column 26, Lines 59-64, the term reading -optical network unit management control interface (OMCI) information, operation management and maintenance (OAM) information; physical layer operation management and maintenance (PLOAM) information and multipoint control protocol (MPCP) information- should read --optical network unit management control interface (OMCI) information or operation management and maintenance (OAM) information; physical layer operation management and maintenance (PLOAM) information or multipoint control protocol (MPCP) information--

Column 27, Lines 13-15, the term reading -a standard of the second transmission channel is different from or identical to a standard of the first transmission channel; or- should read --a standard of the second transmission channel is different from a standard of the first transmission channel; or--